(12) United States Patent
Ishii

(10) Patent No.: US 12,003,345 B2
(45) Date of Patent: Jun. 4, 2024

(54) IN-VEHICLE NETWORK SYSTEM

(71) Applicant: TOYOTA JIDOSHA KABUSHIKI KAISHA, Toyota (JP)

(72) Inventor: Erika Ishii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 17/514,203

(22) Filed: Oct. 29, 2021

(65) Prior Publication Data
US 2022/0182258 A1    Jun. 9, 2022

(30) Foreign Application Priority Data

Dec. 8, 2020   (JP) ................................. 2020-203480

(51) Int. Cl.
*H04L 12/40* (2006.01)
*G06F 9/38* (2018.01)
*G06F 9/4401* (2018.01)

(52) U.S. Cl.
CPC ............ *H04L 12/40* (2013.01); *G06F 9/3891* (2013.01); *G06F 9/4418* (2013.01); *H04L 2012/40273* (2013.01)

(58) Field of Classification Search
CPC .......... H04L 12/40; H04L 2012/40273; G06F 9/3891; G06F 9/4418
See application file for complete search history.

(56) References Cited

U.S. PATENT DOCUMENTS

| | | | |
|---|---|---|---|
| 2002/0054316 A1* | 5/2002 | Abe ..................... | G06F 3/1286 358/1.14 |
| 2011/0271132 A1* | 11/2011 | Merey-Marzat ........................... | H04L 12/40039 713/323 |
| 2012/0030490 A1 | 2/2012 | Makino et al. | |
| 2014/0047255 A1* | 2/2014 | Sasaki .................... | H04L 12/40 713/323 |
| 2015/0301858 A1* | 10/2015 | Chung ................. | G06F 9/4893 718/103 |
| 2021/0037407 A1* | 2/2021 | Park .................. | H01M 10/4207 |
| 2021/0318740 A1* | 10/2021 | Sripada .................... | G06F 1/10 |

FOREIGN PATENT DOCUMENTS

| | | |
|---|---|---|
| JP | 2006-151007 A | 6/2006 |
| JP | 2012-029215 A | 2/2012 |
| JP | 2015-177456 A | 10/2015 |
| WO | 2020/125939 A1 | 6/2020 |

\* cited by examiner

*Primary Examiner* — Nimesh G Patel
(74) *Attorney, Agent, or Firm* — Oliff PLC

(57) ABSTRACT

An in-vehicle network system includes: first processors connected to a bus that is applied to a partial network; and a second processor. Each of the first processors or the second processor send at least one of the first processors in the sleep mode to switch them to the normal mode. Each of the first processors is configured to: assign at least one standby time to each of the first processors and differentiate a standby time assigned to at least one of the first processors from a standby time assigned to other of the first processors, start measuring one of the standby times when sending or receiving one of the NM messages and determine whether or not the standby time has elapsed, and switch at least one of the first processors in which all of the standby times have been determined to have elapsed, to the sleep mode.

5 Claims, 19 Drawing Sheets

| CLUSTER | STANDBY TIME |
|---------|--------------|
| A | 10sec |

| CLUSTER | STANDBY TIME |
|---------|--------------|
| A | 10sec |
| B | 3sec |

| CLUSTER | STANDBY TIME |
|---------|--------------|
| B | 3sec |
| C | 60sec |

| CLUSTER | STANDBY TIME |
|---------|--------------|
| C | 60sec |

IN-VEHICLE NETWORK SYSTEM

CROSS-REFERENCE TO RELATED APPLICATION

This application is based on and claims priority under 35 USC 119 from Japanese Patent Application No. 2020-203480 filed on Dec. 8, 2020, the disclosure of which is incorporated by reference herein.

BACKGROUND

Technical Field

This disclosure relates to an in-vehicle network system.

Related Art

International Publication No. WO 2020/125939 discloses an in-vehicle network system in which a plurality of ECUs are connected to a bus applied to a partial network.

This in-vehicle network system can switch just some of the ECUs from a normal mode (wake-up mode) to a sleep mode. When the ECUs switch to the sleep mode, they consume less power (electrical power) than they do in the normal mode.

The ECUs that are in the normal mode switch to the sleep mode after a predetermined standby time has elapsed. Consequently, it is possible to reduce the power consumed by the ECUs by giving thought to the length of the standby time set for the ECUs. The technology of International Publication No. WO 2020/125939 has room for improvement in relation to the standby time of the ECUs.

In view of the above circumstances, it is an object of this disclosure to obtain an in-vehicle network system that can reduce the power consumed by a plurality of first processors connected to a bus applied to a partial network.

SUMMARY

An in-vehicle network system according to a first aspect of the disclosure includes: a plurality of first processors connected to a bus that is mounted at a vehicle and is applied to a partial network, the first processors being switchable between a normal mode and a sleep mode in which they consume less power than the first processors do in the normal mode; and a second processor. Each of the first processors or the second processor is configured to send an NM message to each of the first processors and switch at least one of the first processors that are in the sleep mode and have received the NM message to the normal mode. Each of the first processors is configured to: assign at least one standby time to each of the first processors and differentiate a standby time assigned to at least one of the first processors from a standby time assigned to other of the first processors, start measuring one of the standby times when sending or receiving one of the NM messages and determine whether or not the standby time has elapsed, and switch at least one of the first processors in which all of the standby times have been determined to have elapsed, to the sleep mode.

The in-vehicle network system according to the first aspect of the disclosure assigns at least one standby time to each of the first processors. Moreover, the in-vehicle network system starts measuring one of the standby times when the first processors have sent or received one of the NM messages and determines whether or not the standby time has elapsed. Moreover, the in-vehicle network system switches at least one of the first processors in which all of the standby times have been determined to have elapsed, to the sleep mode. Consequently, the first processors that are in the normal mode and have sent or received the NM message at a predetermined time switch to the sleep mode when the standby time has elapsed since the predetermined time.

Moreover, each of the first processors differentiates a standby time assigned to at least one of the first processors from a standby time assigned to other of the first processors. For that reason, an appropriate standby time can be assigned to each of the first processors. Additionally, by assigning an appropriate standby time to each of the first processors, the power consumed by the plural first processors connected to the bus can be reduced.

In an in-vehicle network system according to a second aspect of the disclosure, a plurality of clusters each including a plurality of the first processors are provided on the bus. Each of the first processors is included only in one of the clusters. One of the standby times is assigned per cluster. Each of the first processors is configured to: send the NM message to another first processor in a same cluster that includes the first processor sending the NM message, determine whether or not a standby time of the same cluster has elapsed since a predetermined time when receiving the NM message from another first processor, and be switched to the sleep mode when having determined that the standby time has elapsed.

In the second aspect of the disclosure, a plurality of clusters each including a plurality of the first processors are provided on the bus. Moreover, each of the first processors is included only in one of the clusters. Moreover, one of the standby times is assigned per cluster. Each of the first processors determines whether or not a standby time of the same cluster has elapsed since a predetermined time when receiving the NM message from another first processor. Additionally, the first processor switches to the sleep mode when it has determined that the standby time has elapsed. For that reason, by assigning an appropriate standby time to each of the clusters, the power consumed by the plural first processors connected to the bus can be reduced.

In an in-vehicle network system according to a third aspect of the disclosure, a plurality of clusters each including a plurality of the first processors are provided on the bus. At least one of the first processors is included in a plurality of the clusters. One of the standby times is assigned per cluster. Each of the first processors is configured to: send the NM message to another first processor in a same cluster that includes the first processor sending the NM message, determine whether or not a standby time has elapsed since a predetermined time when receiving the NM message from another first processor in all clusters that include the first processor receiving the NM message, and be switched to the sleep mode when having determined that the standby times of all clusters that include the first processor receiving the NM message have elapsed.

In the third aspect of the disclosure, a plurality of clusters each including a plurality of the first processors are provided on the bus. Moreover, at least one of the first processors is included in a plurality of the clusters. Moreover, one of the standby times is assigned per cluster. Each of the first processors determines whether or not a standby time has elapsed since a predetermined time when receiving the NM message from another first processor in all clusters that includes the first processor receiving the NM message. Additionally, the first processor switches to the sleep mode when it has determined that the standby times of all the clusters that include itself have elapsed. For that reason, for example, in a case where one of two first processors included in one cluster is included only in that cluster and the other first processor is included in that cluster and another cluster, the two first processors are separately switched to the sleep mode. For that reason, the power consumed by the plural first processors connected to the bus can be reduced.

In an in-vehicle network system according to a fourth aspect of the disclosure, a plurality of clusters each including a plurality of the first processors are provided on the bus. Each of the first processors is included only in one of the clusters. Each of the first processors is configured to: set the standby time per cluster based on at least one of a status of communication in the bus, statuses of the first processors, or statuses of connected devices connected to the first processors, send the NM message to another first processor in a same cluster that includes the first processor sending the NM message, receive the NM message from another first processor, determine whether or not the standby time of the cluster that includes itself has elapsed since a most recent transmission/reception time that is a later time of a transmission time when the NM message is sent by itself or a reception time when the NM message is received by itself, and be switched to the sleep mode when having determined that the standby time has elapsed.

In the fourth aspect of the disclosure, the first processors set the standby time per cluster based on at least one of a status of communication in the bus, statuses of the first processors, or statuses of connected devices connected to the first processors. Moreover, each of the first processors determines whether or not the standby time of the cluster that includes itself has elapsed since a most recent transmission/reception time that is a later time of a transmission time when the NM message is sent by itself or a reception time when the NM message is received by itself. Additionally, the first processor switches to the sleep mode when it has determined that the standby time has elapsed. The standby time is set per cluster in accordance with the status of the in-vehicle network system, so the power consumed by the plural first processors connected to the bus can be reduced. Moreover, all of the first processors included in one cluster switch to the sleep mode at the same time. For that reason, the occurrence of problems in the clusters caused by the difference between the sleep start times of each of the first processors included in one cluster becoming large is prevented.

In an in-vehicle network system according to a fifth aspect of the disclosure, a plurality of clusters each including a plurality of the first processors are provided on the bus. At least one of the first processors is included in a plurality of the clusters. Each of the first processors is configured to: set the standby time per cluster based on at least one of a status of communication in the bus, statuses of the first processors, or statuses of connected devices connected to the first processors, send the NM message to another first processor in a same cluster that includes the first processor sending the NM message, receive the NM message from another first processor, determine whether or not the standby time has elapsed, in all clusters that include itself, since a most recent transmission/reception time that is a later time of a transmission time when the NM message is sent by itself or a reception time when the NM message is received by itself, and be switched to the sleep mode when having determined that the standby times of all clusters that include itself have elapsed.

In the fifth aspect of the disclosure, the first processors set the standby time per cluster based on at least one of a status of communication in the bus, statuses of the first processors, or statuses of connected devices connected to the first processors. Moreover, each of the first processors determines whether or not the standby time has elapsed, in all clusters that include itself, since a most recent transmission/reception time that is a later time of a transmission time when the NM message is sent by itself or a reception time when the NM message is received by itself. Additionally, the first processor switches to the sleep mode when it has determined that the standby times of all clusters that include itself have elapsed. The standby time is set per cluster in accordance with the status of the in-vehicle network system, so the power consumed by the plural first processors connected to the bus can be reduced.

In an in-vehicle network system according to a sixth aspect of the disclosure, the first processors add information relating to the standby time to the NM message, and the first processors are configured to recognize the standby time that has been added to the NM message when they have sent or received the NM message.

In the sixth aspect of the disclosure, each of the first processors recognizes the standby time when it sends or receives the NM message to which the information relating to the standby time has been added. Consequently, all of the first processors that belong to one cluster can recognize the standby time of that cluster.

In an in-vehicle network system according to a seventh aspect of the disclosure, the first processors are configured, when it has been determined that there is an anomaly in at least one of the first processors or the connected devices both of which are relevant to at least one of driving, braking, or steering of the vehicle, to make the standby time they set for a predetermined cluster longer than the standby time they set when it has been determined that there is no anomaly.

In the seventh aspect of the disclosure, the standby time set for a predetermined cluster becomes longer when there is an anomaly in at least one of the first processors and the connected devices both of which are relevant to at least one of driving, braking, and steering of the vehicle than when it has been determined that there is no anomaly. For that reason, in a case where there is an anomaly in the first processors and the connected devices, the anomalous status can be accurately assessed over a long time (standby time) and then control thereafter can be executed.

In an in-vehicle network system according to an eighth aspect of the disclosure, the vehicle is equipped with data acquisition devices capable of acquiring data of same types as data acquirable by vehicle-to-vehicle communication with another vehicle, and the first processors are configured to make the standby times they set for clusters that include first processors connected to the data acquisition devices shorter when the vehicle-to-vehicle communication is being performed than when the vehicle-to-vehicle communication is not being performed.

The time from when the vehicle starts the vehicle-to-vehicle communication with the other vehicle to until it acquires predetermined data by the vehicle-to-vehicle communication is short. Moreover, the time in which the vehicle and the other vehicle can execute the vehicle-to-vehicle communication is potentially a short time. For that reason, in the case of performing control using, instead of the data acquired by the data acquisition devices capable of acquiring data of same types as that data, the data acquired via the vehicle-to-vehicle communication, it is preferred that the first processors connected to the data acquisition devices be quickly put to sleep. In the eighth aspect of the disclosure, the standby time set for the clusters that include the first processors connected to the data acquisition devices becomes shorter when the vehicle-to-vehicle communication is being performed than when the vehicle-to-vehicle communication is not being performed. Consequently, the first processors connected to the data acquisition devices can be quickly put to sleep.

As described above, the in-vehicle network system according to the disclosure has the superior effect that it can reduce the power consumed by a plurality of first processors connected to a bus applied to a partial network.

BRIEF DESCRIPTION OF THE DRAWINGS

FIG. 5 is a diagram showing a one-dimensional map recorded in a ROM of a first ECU shown in FIG. 1;

FIG. 6 is a diagram showing a one-dimensional map recorded in a ROM of a second ECU shown in FIG. 1;

FIG. 7 is a diagram showing a one-dimensional map recorded in a ROM of a third ECU shown in FIG. 1;

FIG. 8 is a diagram showing a one-dimensional map recorded in a ROM of a fourth ECU shown in FIG. 1;

DETAILED DESCRIPTION

First Embodiment

An embodiment of an in-vehicle network system 10 according to the disclosure will be described below with reference to the drawings.

Figure 1:
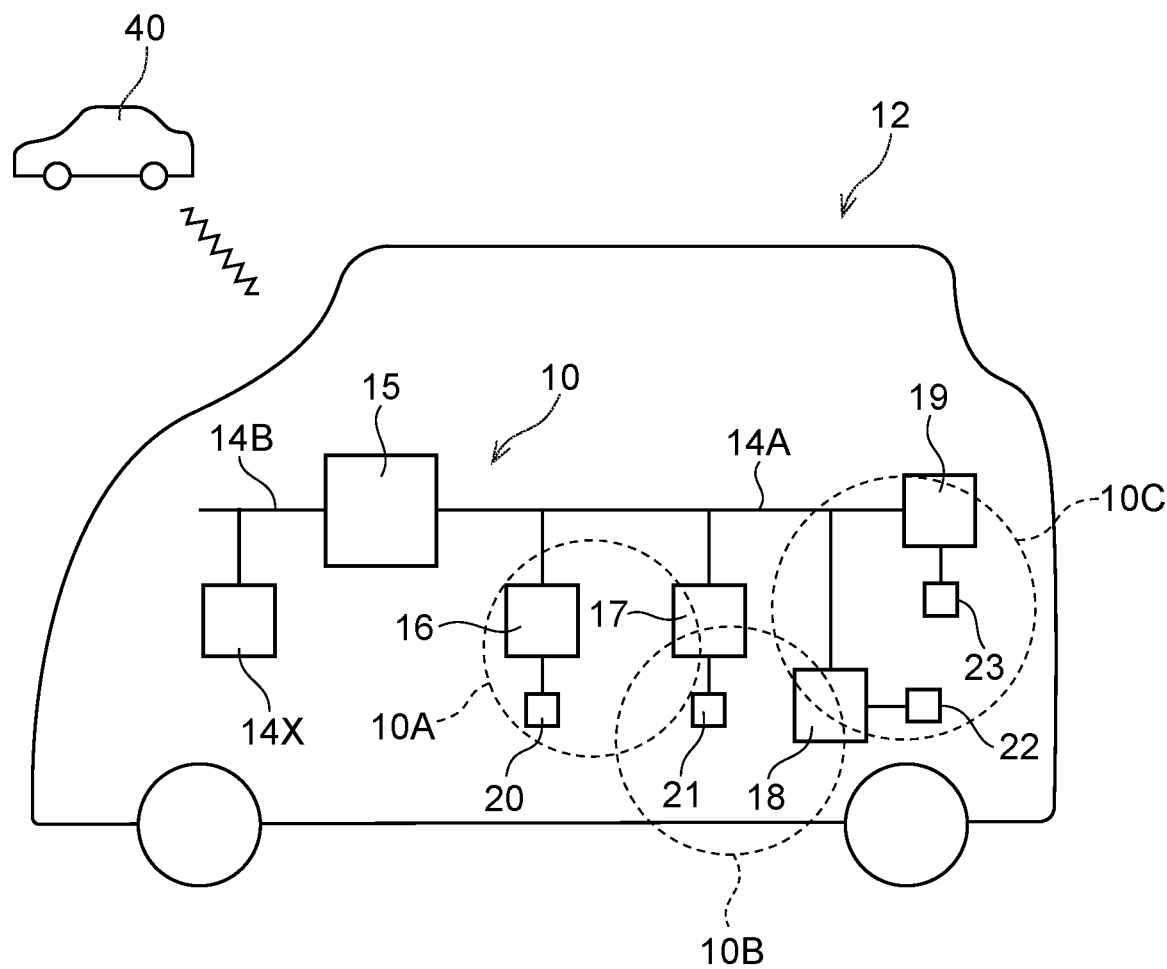
FIG. 1 is a schematic diagram of a vehicle equipped with an in-vehicle network system according to a first embodiment.

FIG. 1 shows a vehicle 12 equipped with the in-vehicle network system 10 of the embodiment. The in-vehicle network system 10 includes a first bus 14A, a second bus 14B, an electronic control unit (ECU) 14X, a gateway 15, a first ECU 16, a second ECU 17, a third ECU 18, and a fourth ECU 19. The gateway 15 is connected by the first bus 14A to the first ECU 16, the second ECU 17, the third ECU 18, and the fourth ECU 19. One or a plurality of the ECUs 14X are connected to the second bus 14B connected to the gateway 15. The network that includes the first bus 14A, the first ECU 16, the second ECU 17, the third ECU 18, and the fourth ECU 19 is a controller area network (CAN) and is applied to partial network management (PNM). The first ECU 16, the second ECU 17, the third ECU 18, and the fourth ECU 19 are NM-corresponding ECUs that conform to AUTOSAR specifications. It will be noted that in the following description the first ECU 16, the second ECU 17, the third ECU 18, and the fourth ECU 19 are sometimes collectively referred to as "the NM-corresponding ECU(s)." The network that includes the second bus 14B and the ECU 14X is, for example, a CAN, Ethernet (registered trademark), or FlexRay (registered trademark). The first ECU 16, the second ECU 17, the third ECU 18, the fourth ECU 19, and the ECU 14X are capable of sending various kinds of information to and receiving various kinds of information from each other via the first bus 14A, the gateway 15, and the second bus 14B.

As shown in FIG. 1, a wireless communication device 20 is connected to the first ECU 16 of this embodiment. The wireless communication device 20 sends information acquired by wireless communication to the first ECU 16 at predetermined periods. For example, the wireless communication device 20 is capable of wirelessly communicating with another vehicle 40 (see FIG. 1). For example, when the occupant of the vehicle 12 operates a touch panel of a display (not shown in the drawings), the wireless communication device 20 executes wireless communication with a wireless communication device of the other vehicle 40.

Cameras 21 are connected to the second ECU 17. The cameras 21 include an area camera that captures subjects positioned in the area around (outside) the vehicle 12 and an in-vehicle camera that captures subjects inside the vehicle. Each of the cameras 21 sends the acquired imaging data to the second ECU 17 at predetermined periods.

A GPS receiver 22 is connected to the third ECU 18. The GPS receiver 22 acquires, at predetermined periods, position information (latitude, longitude, etc.) relating to points at which the vehicle 12 is driving based on GPS signals sent from artificial satellites, and sends the acquired position information to the third ECU 18 at predetermined periods.

A wheel speed sensor 23 is connected to the fourth ECU 19. The wheel speed sensor 23 sends acquired information relating to the wheel speeds to the fourth ECU 19 at predetermined periods.

The first ECU 16, the second ECU 17, the third ECU 18, and the fourth ECU 19 are capable of switching between a normal mode and a sleep mode in which they consume less power (electrical power) than they do in the normal mode. As shown in FIG. 1, the first ECU 16 and the second ECU 17 form an A cluster 10A, the second ECU 17 and the third ECU 18 form a B cluster 10B, and the third ECU 18 and the fourth ECU 19 form a C cluster 10C.

Figure 2:
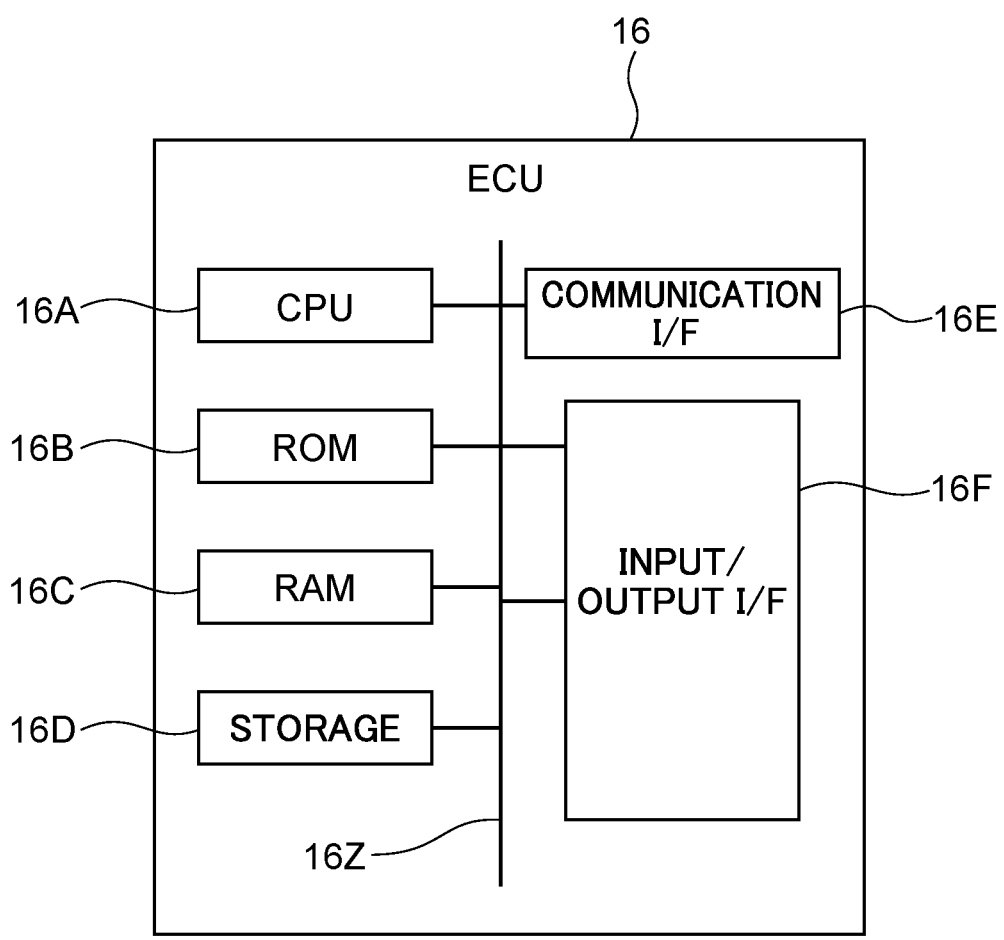
FIG. 2 is a control block diagram of an ECU of the in-vehicle network system shown in FIG. 1.

As shown in FIG. 2, the first ECU 16 is configured to include a central processing unit (CPU; first processor) 16A, a read-only memory (ROM) 16B serving as a non-transitory recording medium, a random-access memory (RAM) 16C serving as a non-transitory recording medium, a storage 16D serving as a non-transitory recording medium, a communication interface (I/F) 16E, and an input/output I/F 16F. The CPU 16A, the ROM 16B, the RAM 16C, the storage 16D, the communication I/F 16E, and the input/output I/F 16F are communicably connected to each other via a bus 16Z. The first ECU 16 is capable of acquiring information relating to times from a timer (not shown in the drawings). It will be noted that although the drawings do not show this, the hardware configurations of the gateway 15, the second ECU 17, the third ECU 18, the fourth ECU 19, and the ECU 14X are the same as the hardware configuration of the first ECU 16. The CPUs of the second ECU 17, the third ECU 18, and the fourth ECU 19 correspond to first processors. The CPU of the gateway 15 corresponds to a second processor.

The CPU 16A is a central processing unit, executes various types of programs, and controls each part of the first ECU 16. That is, the CPU 16A reads programs from the ROM 16B or the storage 16D and executes the programs using the RAM 16C as a workspace. The CPU 16A controls each configuration and performs various types of processing in accordance with the programs recorded in the ROM 16B or the storage 16D.

The ROM 16B stores various types of programs and various types of data. The RAM 16C temporarily stores programs or data as a workspace. The storage 16D is configured by a storage device such as a hard disk drive (HDD) or a solid-state drive (SSD) and stores various types of programs and various types of data. The communication I/F 16E is an interface for the first ECU 16 to communicate with other devices. The communication I/F 16E is connected to the first bus 14A. The input/output I/F 16F is an interface for communicating with devices mounted in the vehicle 12. For example, the wireless communication device 20 is connected to the input/output I/F 16F.

Figure 3:
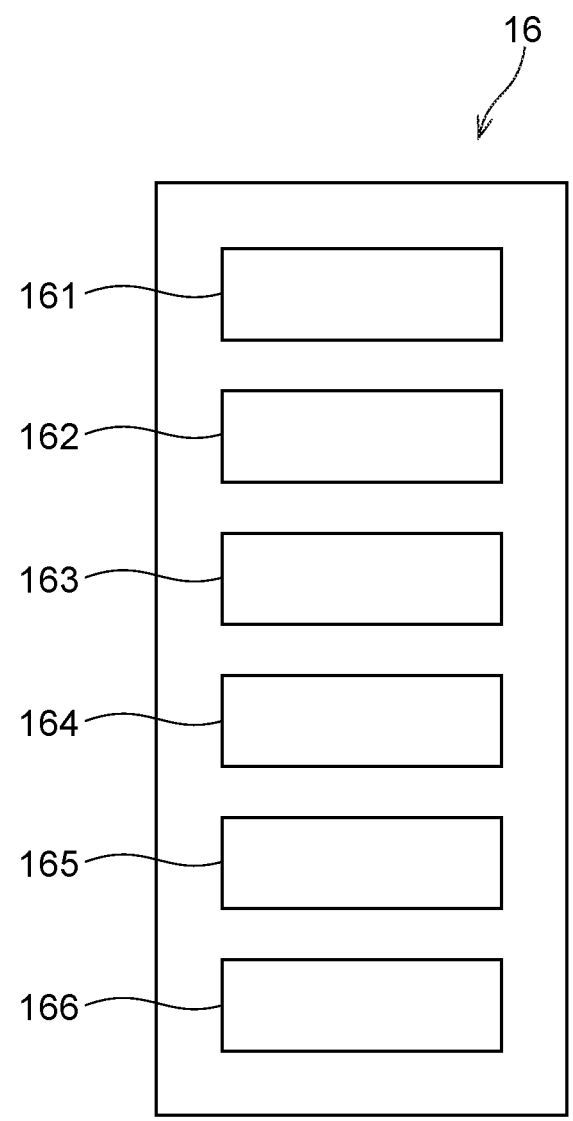
FIG. 3 is a functional block diagram of the ECU shown in FIG. 2.

FIG. 3 is a block diagram showing an example of functional configurations of the first ECU 16. The first ECU 16 includes, as functional configurations, a message generation unit 161, a message transmission unit 162, a message reception unit 163, a determination unit 164, a mode switching unit 165, and a mode determination unit 166. The message generation unit 161, the message transmission unit 162, the message reception unit 163, the determination unit 164, the mode switching unit 165, and the mode determination unit 166 are realized by the CPU 16A reading and executing the programs stored in the ROM 16B. It will be noted that the second ECU 17, the third ECU 18, and fourth ECU 19 also each include, as functional configurations, the message generation unit 161, the message transmission unit 162, the message reception unit 163, the determination unit 164, the mode switching unit 165, and the mode determination unit 166.

Figure 4:
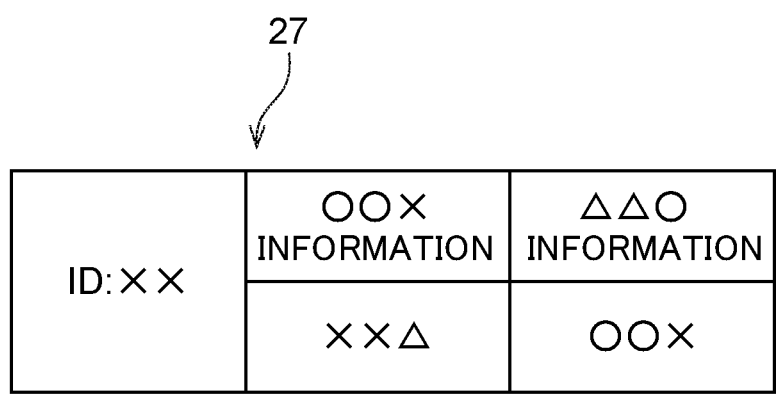
FIG. 4 is a diagram showing an NM message that the ECU shown in FIG. 2 generates.

The message generation unit 161 generates a network management (NM) message 27 shown in FIG. 4. Information relating to the ID of the NM-corresponding ECU that receives the NM message 27 is added to the NM message 27. In this embodiment, the ID of the first ECU 16 is "16," the ID of the second ECU 17 is "17," the ID of the third ECU 18 is "18," and the ID of the fourth ECU 19 is "19." Information different from the information relating to the ID can be added to the NM message 27. Each of the message generation units 161 of the NM-corresponding ECUs that are in the normal mode repeatedly generates the NM message 27 at fixed periods. However, the periods in which the first ECU 16, the second ECU 17, the third ECU 18, and the fourth ECU 19 generate the NM messages 27 are mutually different. Hereinafter, the NM message 27 that the first ECU 16 generates and whose ID is "17" is sometimes referred to as "the NM message 27-1." The NM message 27 that the second ECU 17 generates and whose ID is "16" is sometimes referred to as "the NM message 27-2A," and the NM message 27 that the second ECU 17 generates and whose ID is "18" is sometimes referred to as "the NM message 27-2B." The NM message 27 that the third ECU 18 generates and whose ID is "17" is sometimes referred to as "the NM message 27-3B," and the NM message 27 that the third ECU 18 generates and whose ID is "19" is sometimes referred to as "the NM message 27-3C." The NM message 27 that the fourth ECU 19 generates and whose ID is "18" is sometimes referred to as "the NM message 27-4."

The message transmission units 162 of the NM-corresponding ECUs that are in the normal mode repeatedly send, at fixed periods, the NM messages 27 generated by the message generation units 161. The transmission periods of the first ECU 16, the second ECU 17, the third ECU 18, and the fourth ECU 19 are identical to the generation periods thereof. That is, the transmission periods of the first ECU 16, the second ECU 17, the third ECU 18, and the fourth ECU 19 are mutually different. The message transmission unit 162 of the first ECU 16 sends the NM message 27-1 to the second ECU 17 included in the A cluster 10A. The message transmission unit 162 of the second ECU 17 sends the NM message 27-2A and the NM message 27-2B to the first ECU 16 included in the A cluster 10A and the third ECU 18 included in the B cluster 10B. The message transmission unit 162 of the third ECU 18 sends the NM message 27-3B and the NM message 27-3C to the second ECU 17 included in the B cluster 10B and the fourth ECU 19 included in the C cluster 10C. The message transmission unit 162 of the fourth ECU 19 sends the NM message 27-4 to the third ECU 18 included in the C cluster 10C.

The message reception unit 163 receives the NM message 27 sent by the NM-corresponding ECU other than itself in the cluster that includes itself.

Figure 5:
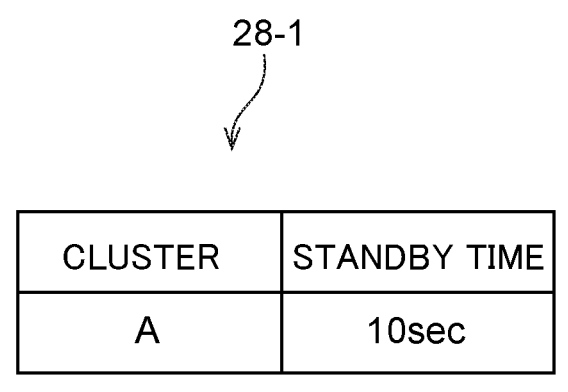
Figure 6:
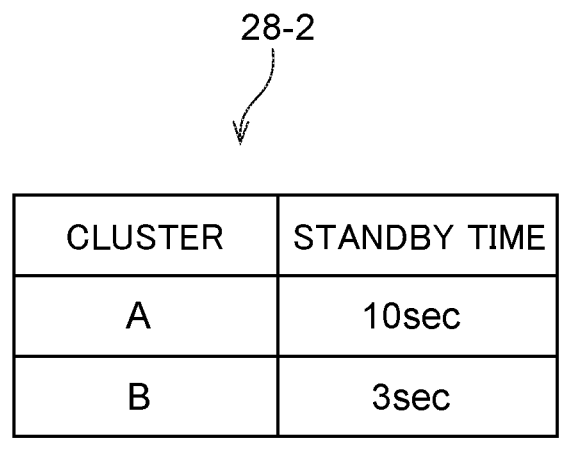
Figure 7:
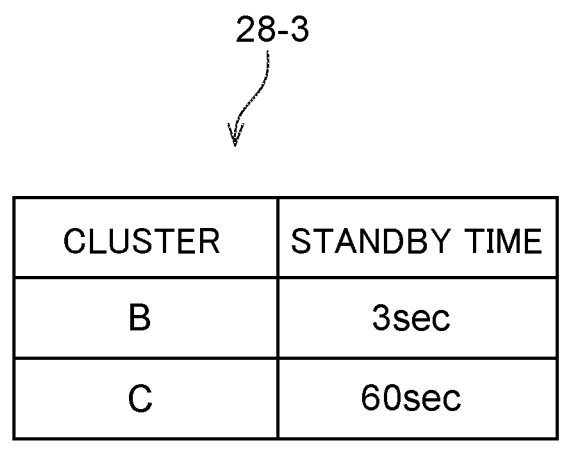
Figure 8:
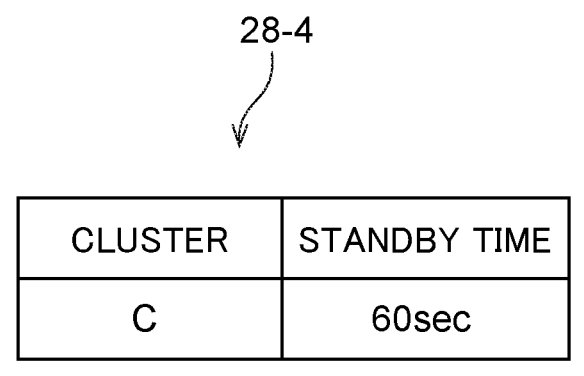

The determination unit 164 determines whether or not a standby time assigned to the cluster that includes itself has elapsed since the time when the message reception unit 163 of the NM-corresponding ECU that is in the normal mode received the most recent NM message 27. A one-dimensional map 28-1 shown in FIG. 5 is recorded in the ROM 16B of the first ECU 16. A one-dimensional map 28-2 shown in FIG. 6 is recorded in the ROM 16B of the second ECU 17. A one-dimensional map 28-3 shown in FIG. 7 is recorded in the ROM 16B of the third ECU 18. A one-dimensional map 28-4 shown in FIG. 8 is recorded in the ROM 16B of the fourth ECU 19. Hereinafter, the one-dimensional maps 28-1, 28-2, 28-3, and 28-4 are sometimes collectively referred to as "the one-dimensional map(s) 28." Each one-dimensional map 28 stores the name of the cluster to which itself belongs and the standby time assigned to the cluster to which itself belongs. For example, when the message reception unit 163 of the first ECU 16 that is in the normal mode receives, at a predetermined time, the most recent NM message 27-2A sent by the second ECU 17, the determination unit 164 of the first ECU 16 determines, with reference to the one-dimensional map 28-1 shown in FIG. 5, whether or not 10 seconds (the standby time) has elapsed since the predetermined time.

The mode switching unit 165 switches the NM-corresponding ECU that is in the normal mode and in which the standby time has been determined to have elapsed by the determination unit 164, to the sleep mode. Moreover, the mode switching unit 165 switches the NM-corresponding ECU to the normal mode when the message reception unit 163 of the NM-corresponding ECU that is in the sleep mode has received the NM message 27.

The mode determination unit 166 determines whether the NM-corresponding ECU that includes itself is in the normal mode or the sleep mode.

Next, flows of processes performed by the NM-corresponding ECUs of this embodiment will be described using the sequence diagram of FIG. 9 and the flowcharts of FIG. 10 to FIG. 12.

Figure 10:
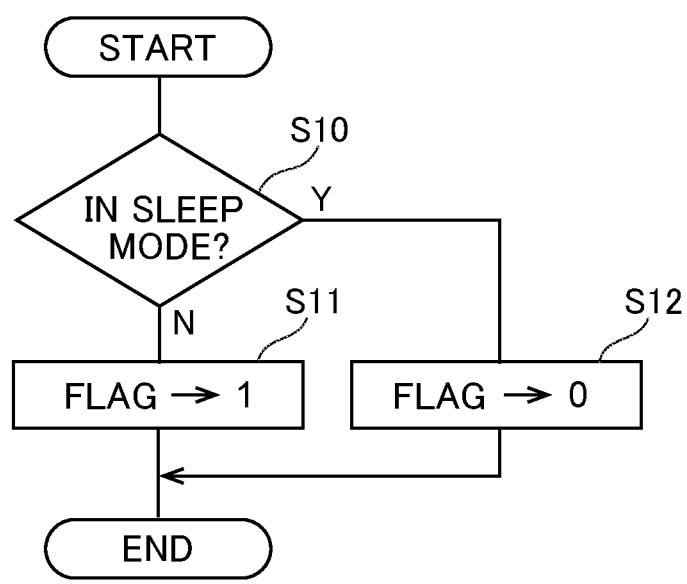
FIG. 10 is a flowchart showing processes that the ECU shown in FIG. 2 performs.

Each of the NM-corresponding ECUs repeatedly executes the processes in the flowchart of FIG. 10 each time a predetermined amount of time elapses.

First, in step S10 the mode determination unit 166 of the NM-corresponding ECU determines whether or not it is in the sleep mode.

When determining No in step S10, the NM-corresponding ECU proceeds to step S11 and the mode determination unit 166 sets a flag to "1." On the other hand, when determining Yes in step S10, the NM-corresponding ECU proceeds to step S12 and the mode determination unit 166 sets the flag to "0." It will be noted that the initial value of the flag is "0."

The NM-corresponding ECU temporarily ends the processes in the flowchart of FIG. 10 when it has finished the process of step S11 or step S12.

Figure 11:
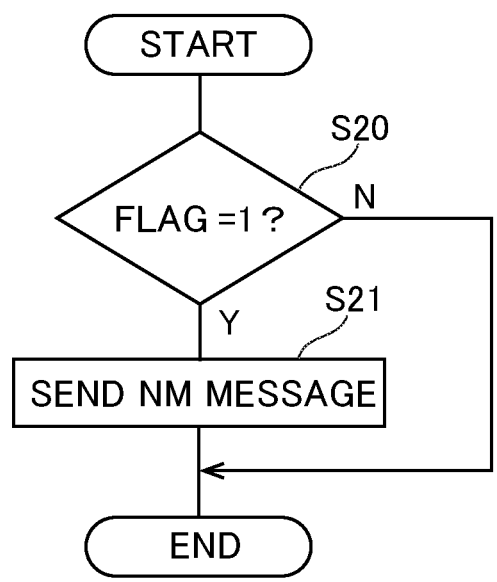
FIG. 11 is a flowchart showing processes that the ECU shown in FIG. 2 performs.

Each of the NM-corresponding ECUs repeatedly executes the processes in the flowchart of FIG. 11 each time a predetermined amount of time elapses.

First, in step S20 the message generation unit 161 of the NM-corresponding ECU determines whether or not the flag is "1."

When determining Yes in step S20, the NM-corresponding ECU proceeds to step S21. The message generation unit 161 generates the NM message 27, and the message transmission unit 162 sends this NM message 27.

Figure 9:
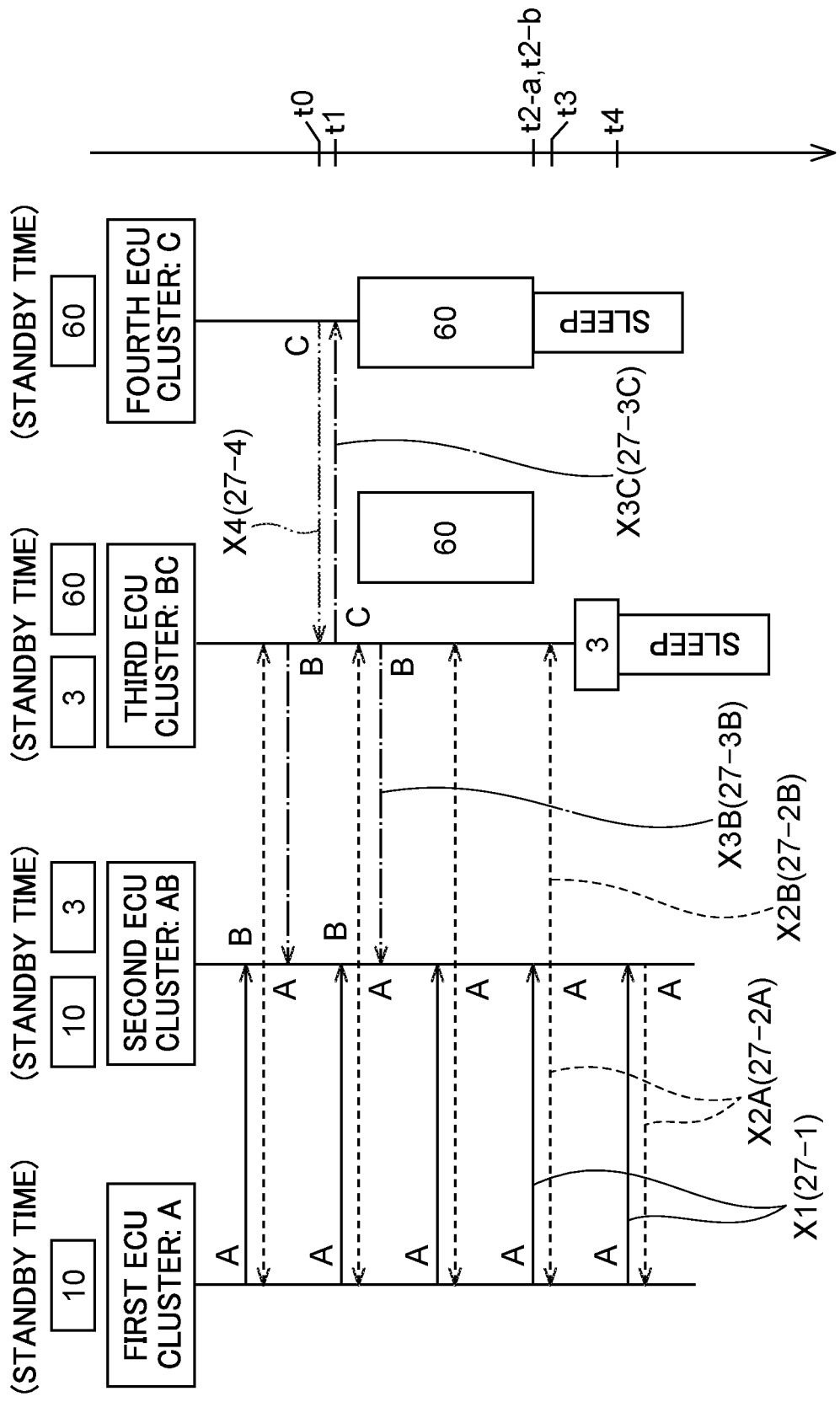
FIG. 9 is a sequence diagram showing actions that the in-vehicle network system shown in FIG. 1 executes.

Arrows X1 indicated by solid lines in FIG. 9 represent that the first ECU 16 sends the NM message 27-1 to the second ECU 17.

Arrows X2A indicated by dashed lines in FIG. 9 represent that the second ECU 17 sends the NM message 27-2A to the first ECU 16 and the third ECU 18. However, as mentioned above, whereas the first ECU 16 receives the NM message 27-2A, the third ECU 18 does not receive the NM message 27-2A. For that reason, FIG. 9 does not show arrows X2A going from the second ECU 17 to the third ECU 18. Arrows X2B indicated by dashed lines in FIG. 9 represent that the second ECU 17 sends the NM message 27-2B. However, as mentioned above, whereas the first ECU 16 does not receive the NM message 27-2B, the third ECU 18 receives the NM message 27-2B. For that reason, FIG. 9 does not show arrows X2B going from the second ECU 17 to the first ECU 16.

Arrows X3B indicated by dash-dot-dash lines in FIG. 9 represent that the third ECU 18 sends the NM message 27-3B to the second ECU 17 and the fourth ECU 19. However, as mentioned above, whereas the second ECU 17 receives the NM message 27-3B, the fourth ECU 19 does not receive the NM message 27-3B. For that reason, FIG. 9 does not show arrows X3B going from the third ECU 18 to the fourth ECU 19. Arrows X3C indicated by dash-dot-dash lines in FIG. 9 represent that the third ECU 18 sends the NM message 27-3C to the second ECU 17 and the fourth ECU 19. However, as mentioned above, whereas the second ECU 17 does not receive the NM message 27-3C, the fourth ECU 19 receives the NM message 27-3C. For that reason, FIG. 9 does not show arrows X3C going from the third ECU 18 to the second ECU 17.

Arrows X4 indicated by dash-dot-dot-dash lines in FIG. 9 represent that the fourth ECU 19 sends the NM message 27-4 to the third ECU 18.

For example, at time t0 the fourth ECU 19 sends the NM message 27-4 to the third ECU 18. Moreover, at time t1 the third ECU 18 sends the NM message 27-3C to the fourth ECU 19. It will be noted that the difference between time t1 and time t0 is extremely small. Moreover, at time t3 the second ECU 17 sends the NM message 27-2B to the third ECU 18.

The NM-corresponding ECU temporarily ends the processes in the flowchart of FIG. 11 when determines No in step S20 or when it has finished the process of step S21.

Figure 12:
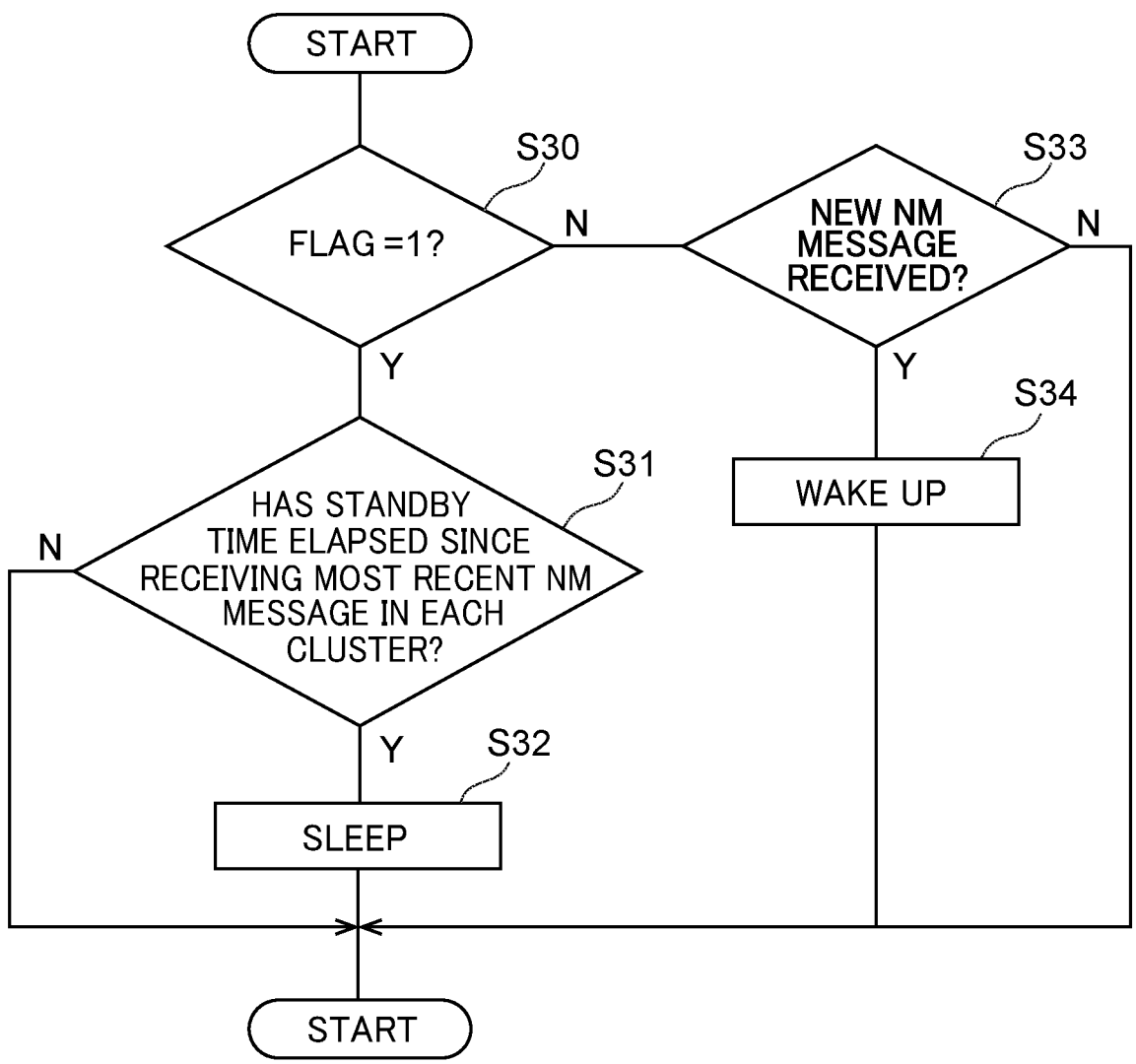
FIG. 12 is a flowchart showing processes that the ECU shown in FIG. 2 performs.

Each of the NM-corresponding ECUs repeatedly executes the processes in the flowchart of FIG. 12 each time a predetermined amount of time elapses.

First, in step S30 the determination unit 164 of the NM-corresponding ECU determines whether or not the flag is "1."

When determining Yes in step S30, the NM-corresponding ECU proceeds to step S31. The determination unit 164 determines, with reference to the one-dimensional map 28, whether or not the standby time has elapsed since the predetermined time when it received the most recent NM message 27. Moreover, the determination unit 164, in a case where the NM-corresponding ECU that includes itself belongs to a plurality of clusters, determines whether or not the standby time has elapsed in all of the clusters.

For example, the fourth ECU 19 that belongs only to the C cluster 10C receives the NM message 27-3C from the third ECU 18 at time t1 in FIG. 9. Then, the determination unit 164 of the fourth ECU 19 determines Yes in step S31 at time t2b when 60 seconds elapse since time t1.

For example, the third ECU 18 that belongs to the B cluster 10B and the C cluster 10C receives the most recent NM message 27-4 in cluster C at time t0 in FIG. 9 and receives the most recent NM message 27-2B in cluster B at time t3. Consequently, at time t2a when the standby time (60 seconds) elapses since time t0, the determination unit 164 of the third ECU 18 determines that the standby time has elapsed. Moreover, at time t4 when the standby time (3 seconds) elapses since time t3, the determination unit 164 of the third ECU 18 determines that the standby time has elapsed. It will be noted that the difference between time t2a and time t2b is extremely small. Then, the determination unit 164 of the third ECU 18 determines Yes in step S31 at time t4 later than time t2a.

When determining Yes in step S31, the NM-corresponding ECU proceeds to step S32. Consequently, for example, at time t2b the mode switching unit 165 of the fourth ECU 19 switches the fourth ECU 19 to the sleep mode. Moreover, at time t4 when the standby time (60 seconds) in cluster C elapses and the standby time (3 seconds) in cluster B elapses, the mode switching unit 165 of the third ECU 18 switches the third ECU 18 to the sleep mode.

On the other hand, when determining No in step S30, the NM-corresponding ECU proceeds to step S33 and the message reception unit 163 determines whether or not it has received a new NM message 27 in the cluster that includes itself.

When determining Yes in step S33, the NM-corresponding ECU proceeds to step S34. For example, when the message reception unit 163 of the third ECU 18 receives a new NM message 27 from the second ECU 17 at a time later than time t4, the third ECU 18 proceeds to step S34. Then, the mode switching unit 165 of the third ECU 18 switches (wakes up) the third ECU 18 from the sleep mode to the normal mode.

The NM-corresponding ECU temporarily ends the processes in the flowchart of FIG. 12 when the determination in S31 or step S33 is NO or when the process of step S32 or step S34 is finished.

Action and Effects

Next, the action and effects of this embodiment will be described.

In the in-vehicle network system 10 of this embodiment, a plurality of clusters (the A cluster 10A, the B cluster 10B, the C cluster 10C) are provided on the first bus 14A, and a plurality of ECUs (the first ECU 16, the second ECU 17, the third ECU 18, and the fourth ECU 19) are included in each of the clusters. Moreover, the second ECU 17 and the third ECU 18 are each included in a plurality of the clusters. Moreover, each of the one-dimensional maps 28 (standby time assignment units) assigns one standby time to each of the clusters (the A cluster 10A, the B cluster 10B, and the C cluster 10C), and the standby times are mutually different. Additionally, the determination unit 164 of each of the NM-corresponding ECUs determines whether or not the standby time of the cluster that includes itself has elapsed since a predetermined time when it received the NM message 27 from another NM-corresponding ECU. Then, when the determination unit 164 has determined that the standby times of all of the clusters to which it belongs have elapsed, the mode switching unit 165 switches the NM-corresponding ECU that is the normal mode to the sleep mode. For that reason, the fourth ECU 19 included only in the C cluster 10C and the third ECU 18 included in the B cluster 10B and the C cluster 10C can be separately switched to the sleep mode. For that reason, the power consumed by the plural NM-corresponding ECUs connected to the first bus 14A can be reduced.

Figure 13:
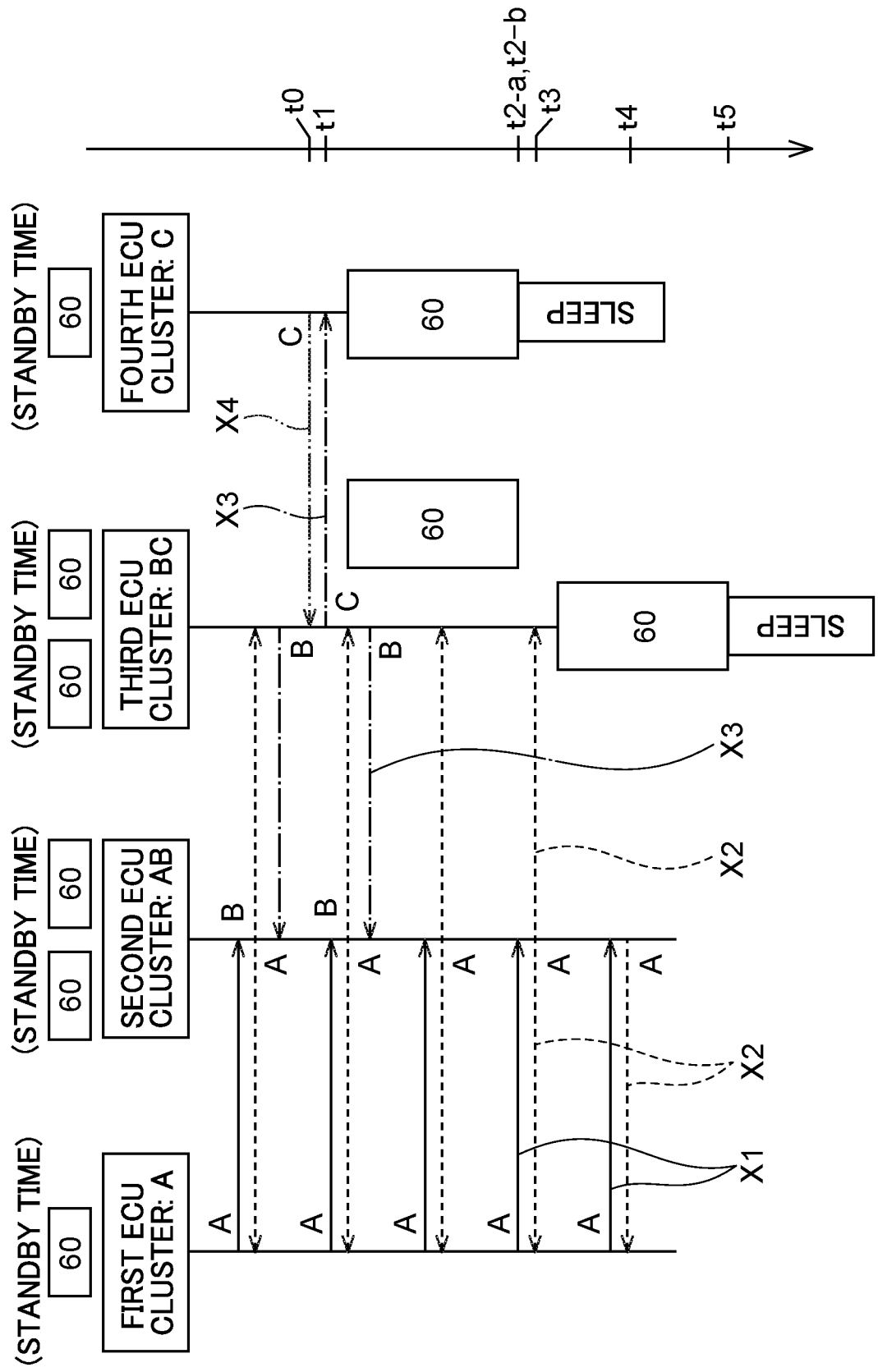
FIG. 13 is a sequence diagram showing actions that an in-vehicle network system of a comparative example executes.

FIG. 13 shows a comparative example. In this comparative example, the standby times of the A cluster 10A, the B cluster 10B, and the C cluster 10C are identically set. That is, the standby times of the A cluster 10A, the B cluster 10B, and the C cluster 10C are 60 seconds. In this case, at time t5 when the standby time (60 seconds) in cluster C elapses and the standby time (60 seconds) in cluster B elapses, the mode switching unit 165 of the third ECU 18 switches the third ECU 18 to the sleep mode. For that reason, the time (t5) when the third ECU 18 starts the sleep mode is later than the time (t4) when the sleep mode starts in the above embodiment. For that reason, the power consumed by the plural NM-corresponding ECUs connected to the first bus 14A in the comparative example becomes greater than the power consumed by the plural NM-corresponding ECUs in the above embodiment.

Second Embodiment

Next, a second embodiment of the in-vehicle network system 10 according to the disclosure will be described with reference to FIG. 14 to FIG. 17. It will be noted that the same reference signs are assigned to configurations that are the same as those in the first embodiment, and description will be omitted as appropriate.

The one-dimensional maps 28 are not recorded in the ROMs 16B of the NM-corresponding ECUs of the second embodiment.

Figure 15:
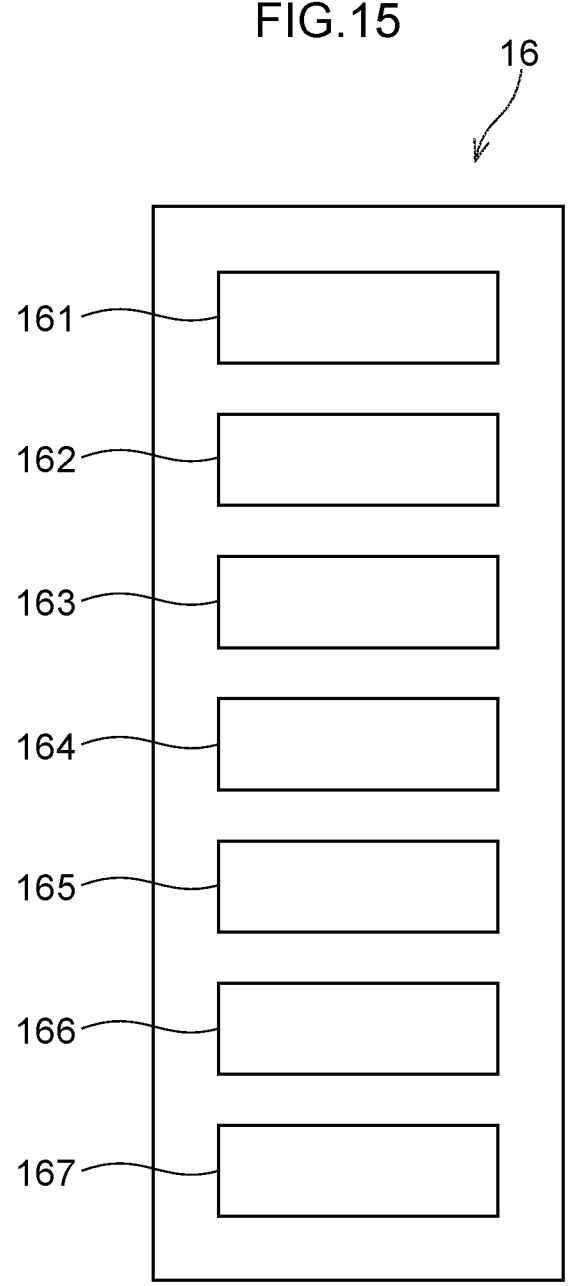
FIG. 15 is a functional block diagram of the ECU according to the second embodiment.
Figure 16:
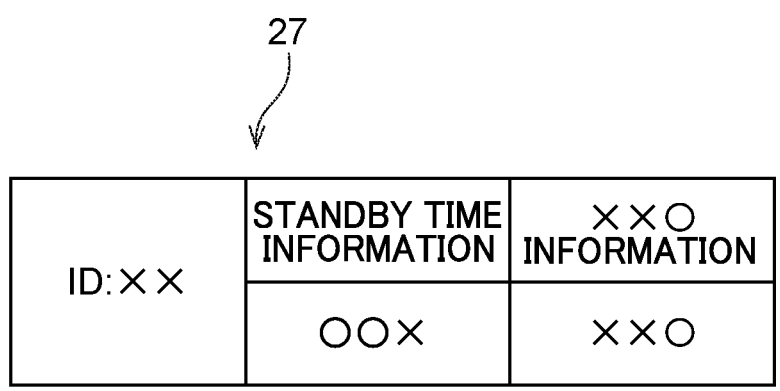
FIG. 16 is a diagram showing an NM message that the ECU according to the second embodiment generates.

As shown in FIG. 15, the NM-corresponding ECUs of the second embodiment each have, as functional configurations, a standby time setting unit 167 in addition to the message generation unit 161, the message transmission unit 162, the message reception unit 163, the determination unit 164, the mode switching unit 165, and the mode determination unit 166. As shown in FIG. 16, information relating to the ID of the NM-corresponding ECU that receives the NM message 27 and information relating to the standby time are added to the NM messages 27 that the message generation units 161 of the NM-corresponding ECUs of the second embodiment generate. The information relating to the standby time is generated and added to the NM messages 27 by the standby time setting units 167 of the NM-corresponding ECUs.

The standby time setting unit 167 of each NM-corresponding ECU is capable of detecting anomalies (faults) in the constituent elements of the in-vehicle network system 10. Each NM-corresponding ECU (standby time setting unit 167) is capable of detecting, based on information from connected devices (the wireless communication device 20, the cameras 21, the GPS receiver 22, the wheel speed sensor 23) connected to itself, anomalies in the connected devices. Moreover, each standby time setting unit 167 is capable of detecting communication anomalies in the first bus 14A. Moreover, the standby time setting unit 167 of each NM-corresponding ECU is capable of detecting, based on information received from the other NM-corresponding ECUs and information received from the ECU 14X, anomalies in the other NM-corresponding ECUs and the connected devices connected to the other NM-corresponding ECUs, communication anomalies in the second bus 14B, and anomalies in the ECU 14X provided on the second bus 14B and connected devices (e.g., a speaker, a display, etc.) connected to the ECU 14X. The standby time setting unit 167 determines that the in-vehicle network system 10 is in an anomalous state when it has detected an anomaly in the in-vehicle network system 10. Moreover, the standby time setting unit 167 determines whether or not a special condition described later has been met.

In a case where the standby time setting unit 167 has determined that the in-vehicle network system 10 is not in an anomalous state and the special condition is not met, the standby time that the standby time setting unit 167 adds to the NM message 27 is "10 seconds." Furthermore, in a case where the standby time setting unit 167 has determined that the in-vehicle network system 10 is not in an anomalous state and the special condition is met, the standby time that the standby time setting unit 167 adds to the NM message 27 is "3 seconds."

Furthermore, in a case where the standby time setting unit 167 has determined that a constituent element not relevant (hereinafter, "irrelevant part") to at least one of driving, braking, and steering of the vehicle among the constituent elements of the in-vehicle network system 10 is in an anomalous state, the standby time that the standby time setting unit 167 adds to the NM message 27 is "60 seconds." For example, in a case where there is an anomaly in a speaker, an air conditioner, and a navigation system provided in the vehicle or ECUs to which these are connected, the standby time added to the NM message 27 is "60 seconds."

Furthermore, in a case where the standby time setting unit 167 has determined that a constituent element that is relevant (hereinafter, "relevant part") to at least one of driving, braking, and steering of the vehicle among the constituent elements of the in-vehicle network system 10 is in an anomalous state, the standby time that the standby time setting unit 167 adds to the NM message 27 is "90 seconds." For example, in a case where there is an anomaly in the wireless communication device 20, the wheel speed sensor 23, a brake actuator, an electric power steering (EPS)

actuator, an engine starter motor, or ECUs to which these are connected, the standby time added to the NM message 27 is "90 seconds."

Moreover, in this embodiment, the standby time setting unit 167 determines that the special condition is met when, for example, the distance between the vehicle 12 and the other vehicle 40 is equal to or less than a predetermined length. In other words, the standby time setting unit 167 determines that the special condition is met when the vehicle 12 (the wireless communication device 20) and the other vehicle 40 become capable of executing vehicle-to-vehicle communication.

The determination unit 164 of each NM-corresponding ECU in the second embodiment recognizes a transmission time, which is the time when the message transmission unit 162 of the NM-corresponding ECU that is in the normal mode sends the most recent NM message 27, and a reception time, which is the time when the message reception unit 163 receives the most recent NM message 27. Moreover, the determination unit 164 recognizes the most recent transmission/reception time, which is one of the transmission time and the reception time and is the time later than the other. The NM-corresponding ECU that sent the most recent NM message 27 determines whether or not the standby time recorded in the NM message 27 it sent has elapsed since the most recent transmission/reception time (transmission time). The NM-corresponding ECU that received the most recent NM message 27 determines whether or not the standby time recorded in the NM message 27 it received has elapsed since the most recent transmission/reception time (reception time).

Figure 14:
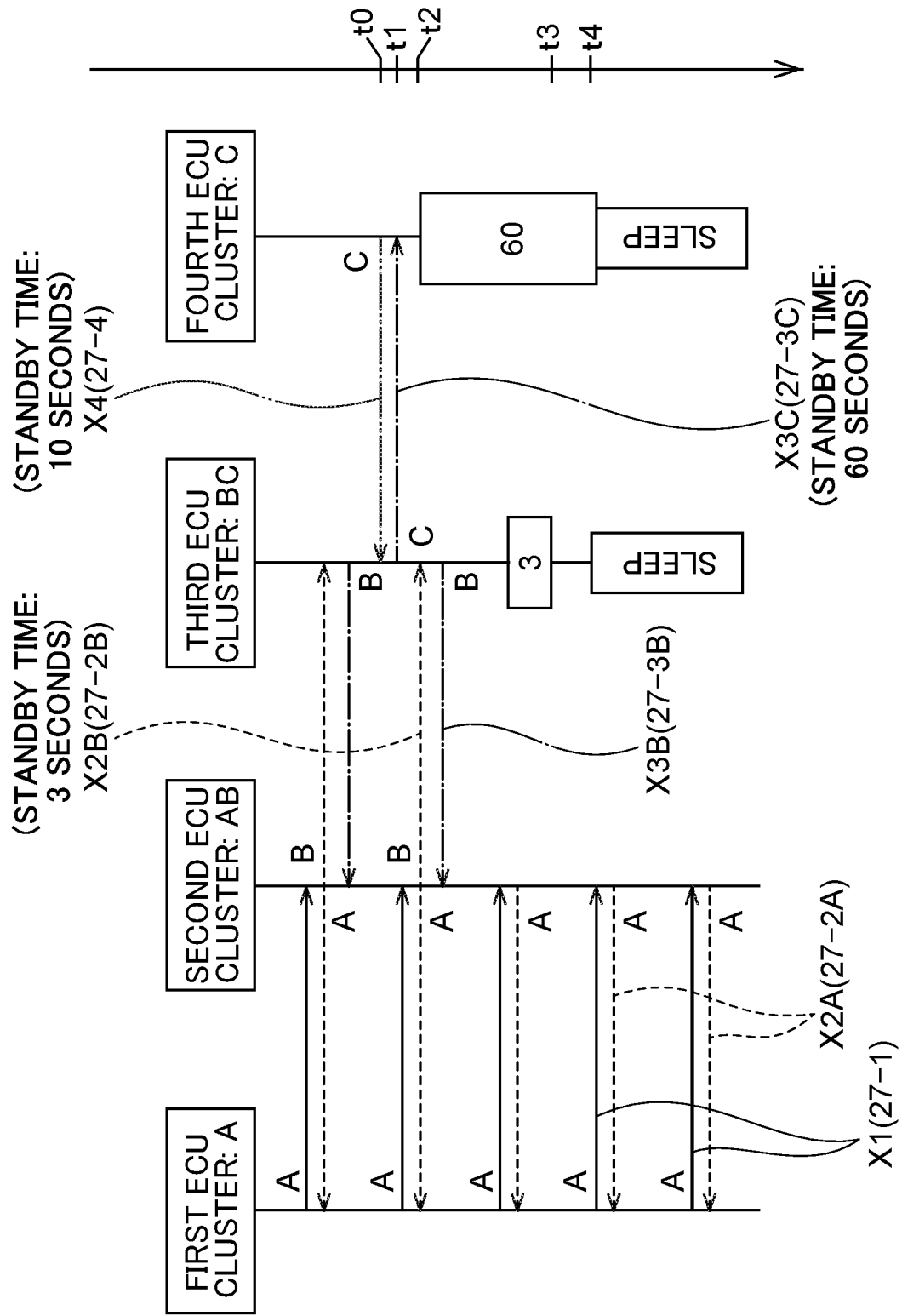
FIG. 14 is a sequence diagram showing actions that the in-vehicle network system according to a second embodiment executes.

Next, flows of processes performed by the NM-corresponding ECUs of this embodiment will be described using the sequence diagram of FIG. 14 and the flowcharts of FIG. 10, FIG. 11, and FIG. 17.

Each of the NM-corresponding ECUs of this embodiment repeatedly executes the processes in the flowchart of FIG. 10 each time a predetermined amount of time elapses.

Each of the NM-corresponding ECUs of this embodiment repeatedly executes the processes in the flowchart of FIG. 11 each time a predetermined amount of time elapses.

When determining Yes in step S20, the NM-corresponding ECU proceeds to step S21, and the message generation unit 161 generates the NM message 27 and the message transmission unit 162 sends the NM message 27. For example, at time t0 in FIG. 14 the fourth ECU 19 sends the NM message 27-4 to the third ECU 18. Moreover, at time t1 the third ECU 18 sends the NM message 27-3C to the fourth ECU 19. Moreover, at time t2 the second ECU 17 sends the NM message 27-2B to the third ECU 18.

Figure 17:
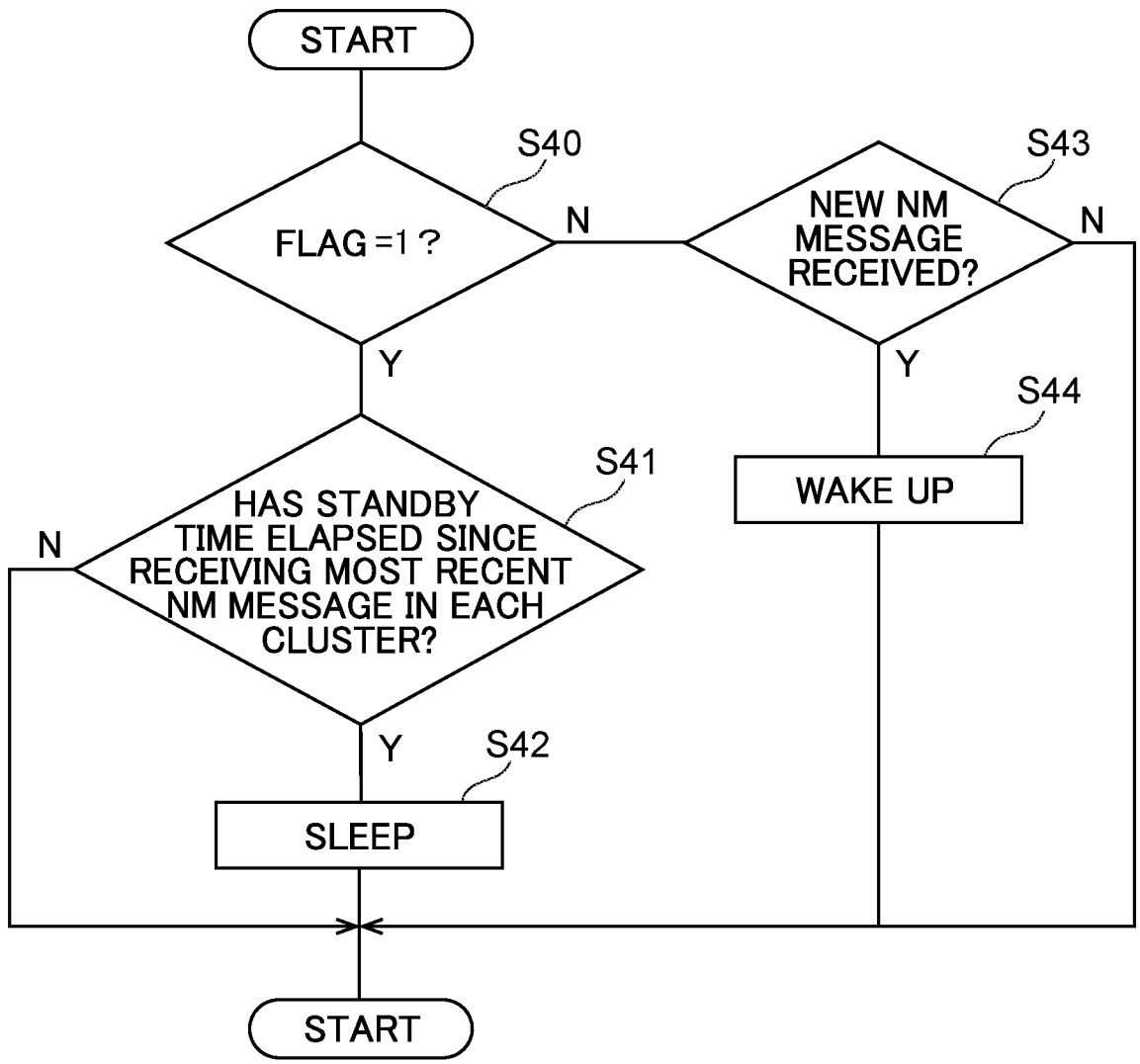
FIG. 17 is a flowchart showing processes that the ECU according to the second embodiment performs.

Moreover, each of the NM-corresponding ECUs of this embodiment repeatedly executes the processes in the flowchart of FIG. 17 each time a predetermined amount of time elapses. It will be noted that steps S40, S42, S43, and S44 in FIG. 17 are identical to steps S30, S32, S33, and S34, respectively, in FIG. 12.

When determining Yes in step S40, the NM-corresponding ECU proceeds to step S41 and determines whether or not the standby time recorded in the most recent NM message 27 has elapsed since the most recent transmission/reception time when it sent or received the most recent NM message 27.

For example, at time t0 the fourth ECU 19 and the third ECU 18 send and receive the NM message 27-4. Suppose that at this time the standby time setting unit 167 has determined that the in-vehicle network system 10 is not in an anomalous state and the special condition is not met. For that reason, the standby time that the standby time setting unit 167 adds to this NM message 27-4 is "10 seconds."

Moreover, at time t1 the third ECU 18 and the fourth ECU 19 send and receive the NM message 27-3C. Suppose that at this time the standby time setting unit 167 has determined that the irrelevant part is in an anomalous state. For that reason, the standby time that the standby time setting unit 167 adds to this NM message 27-3C is "60 seconds." Consequently, at time t4 when 60 seconds elapse since time t1, the determination unit 164 of the fourth ECU 19 determines Yes in step S41.

Moreover, at time t2 the second ECU 17 and the third ECU 18 send and receive the NM message 27-2B. Suppose that at this time the distance between the vehicle 12 and the other vehicle 40 is equal to or less than the predetermined length. In other words, suppose that at this time the standby time setting unit 167 has determined that the special condition is met. For that reason, the standby time that the standby time setting unit 167 adds to this NM message 27-2B is "3 seconds." Consequently, at time t3 when 3 seconds elapse since time t2, the determination unit 164 of the third ECU 18 determines that the standby time has elapsed. Moreover, at time t4 when 60 seconds elapse since time t1, the determination unit 164 of the third ECU 18 determines that the standby time has elapsed. Additionally, the determination unit 164 of the third ECU 18 determines Yes in step S41 at time t4 later than time t3.

When determining Yes in step S41, the NM-corresponding ECU proceeds to step S42. Consequently, at time t4 the mode switching unit 165 of the fourth ECU 19 switches the fourth ECU 19 to the sleep mode. Moreover, at time t4 the mode switching unit 165 of the third ECU 18 switches the third ECU 18 to the sleep mode.

Action and Effects

Next, the action and effects of this embodiment will be described.

The standby time setting units 167 of the NM-corresponding ECUs of the in-vehicle network system 10 of this embodiment set the standby time per cluster based on the statuses of the constituent elements of the in-vehicle network system 10. In other words, the standby time is set per cluster based on the status of communication in the first bus 14A and the second bus 14B, the statuses of the ECUs, and the statuses of the connected devices connected to the ECUs. The standby time is set per cluster in accordance with the status of the in-vehicle network system 10 in this way, so the power consumed by the plural NM-corresponding ECUs connected to the first bus 14A can be reduced.

Moreover, the NM-corresponding ECUs that are in the normal mode switch to the sleep mode when the standby time recorded in the most recent NM message 27 has elapsed since the most recent transmission/reception time. Consequently, the NM-corresponding ECUs switch to the sleep mode when the standby times set per cluster have elapsed in accordance with the status of the in-vehicle network system. For that reason, the fourth ECU 19 included only in the C cluster 10C and the third ECU 18 included in the B cluster 10B and the C cluster 10C can be separately switched to the sleep mode at predetermined timings according to the status of the in-vehicle network system 10. Consequently, the power consumed by the plural NM-corresponding ECUs connected to the first bus 14A can be reduced.

Moreover, the standby time (60 seconds or 90 seconds) set for a predetermined cluster in a case where the in-vehicle network system 10 is in the anomalous state becomes longer than the standby time (10 seconds or 3 seconds) set for a predetermined cluster in a case where the in-vehicle network system 10 is not in the anomalous state. For that reason, for example, in a case where there is an anomaly in at least one ECU or connected device, the anomalous status can be accurately assessed over a long time (standby time) and then control thereafter can be executed.

Moreover, in a case where the standby time setting unit 167 has determined that the relevant part, which is a constituent element relevant to at least one of driving, braking, and steering of the vehicle among the constituent elements of the in-vehicle network system 10, is in an anomalous state, the standby time that the standby time setting unit 167 adds to the NM message 27 is "90 seconds." In a case where the relevant part is in an anomalous state, it is necessary to more accurately assess the anomalous state than it is in a case where the irrelevant part is in an anomalous state. In this embodiment, the standby time is set to 90 seconds in this case, so the anomalous state of the relevant part can be accurately assessed.

The time from when the wireless communication device 20 of the vehicle 12 starts the vehicle-to-vehicle communication with the other vehicle 40 until when the wireless communication device 20 acquires predetermined data by the vehicle-to-vehicle communication is short. Moreover, the time in which the vehicle 12 and the other vehicle 40 can execute the vehicle-to-vehicle communication can be a short time. For that reason, in the case of performing control using, instead of the data acquired by the data acquisition devices (e.g., the cameras 21, the GPS receiver 22) capable of acquiring data of the same types as the data (imaging data acquired by the cameras, GPS position information), the data (e.g., imaging data, GPS position information) acquired via the vehicle-to-vehicle communication, it is preferred that the NM-corresponding ECUs (e.g., the second ECU 17 and the third ECU 18) connected to the data acquisition devices be quickly put to sleep. In this embodiment, the special condition is met when, for example, the distance between the vehicle 12 and the other vehicle 14 is equal to or less than the predetermined length. Additionally, when the special condition is met, the standby time (3 seconds) set for the clusters that include the NM-corresponding ECUs connected to the data acquisition devices is shorter than the standby time (10 seconds) when the vehicle-to-vehicle communication is not being performed. Consequently, the NM-corresponding ECUs connected to the data acquisition devices can be quickly put to sleep.

The in-vehicle network system 10 according to this embodiment has been described above, but the in-vehicle network system 10 is capable of design changes as appropriate in a range that does not depart from the spirit of the disclosure.

The standby time setting units 167 of the NM-corresponding ECUs of the in-vehicle network system 10 of the second embodiment may set the standby time per cluster based on at least one of the status of communication in the first bus 14A and the second bus 14B, the statuses of the ECUS, and the statuses of the connected devices connected to the ECUs.

Figure 18:
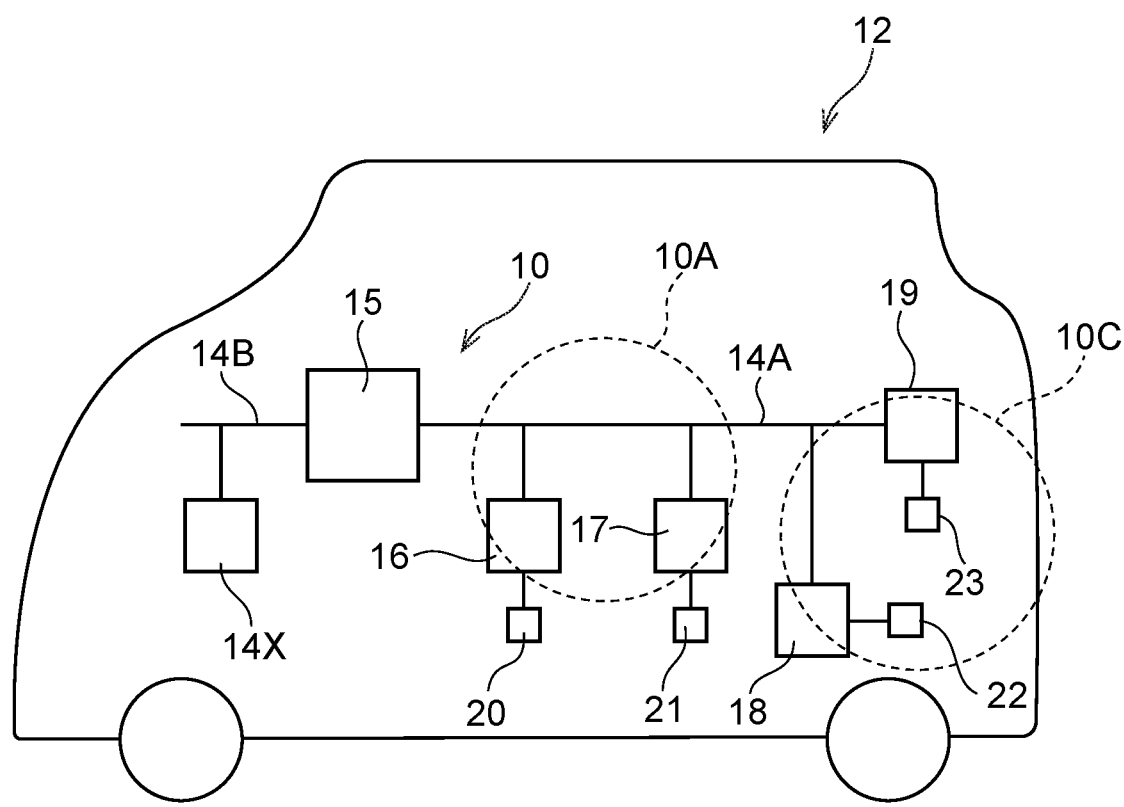
FIG. 18 is a schematic diagram of the vehicle equipped with the in-vehicle network system according to a first example modification.

In the in-vehicle network system 10 of an example modification shown in FIG. 18, there is no B cluster 10B. That is, the second ECU 17 belongs only to the A cluster 10A, and the third ECU 18 belongs only to the C cluster 10C.

In a case where the technical thought of the first embodiment is applied to the example modification in FIG. 18, the NM-corresponding ECUs included in one cluster (e.g., the C cluster 10C) send and receive the NM messages 27 to each other in a short time, whereby all of the NM-corresponding ECUs included in one cluster can be switched to the sleep mode at substantially the same time. For example, when at time t0 in FIG. 9 the fourth ECU 19 sends the NM message 27-4 and at time t1 the third ECU 18 sends the NM message 27-3C, the third ECU 18 and the fourth ECU 19 switch to the sleep mode at substantially the same time at times t2a and t2b.

Furthermore, in a case where the technical thought of the second embodiment is applied to the example modification in FIG. 18, all of the NM-corresponding ECUs included in one cluster (e.g., the C cluster 10C) switch to the sleep mode at the same time. For example, in a case where the third ECU 18 sends the NM message 27-3C at time t1 in FIG. 14, the third ECU 18 and the fourth ECU 19 switch to the sleep mode at the same time at time t4.

In this way, in the example modification in FIG. 18, all of the NM-corresponding ECUs included in one cluster can be switched to the sleep mode at the same time or substantially the same time. Consequently, the difference between the sleep start time of one NM-corresponding ECU included in one cluster and the sleep start time of another NM-corresponding ECU included in this cluster is prevented from becoming large. For that reason, the occurrence of problems in the clusters caused by this difference becoming large is prevented.

Figure 19:
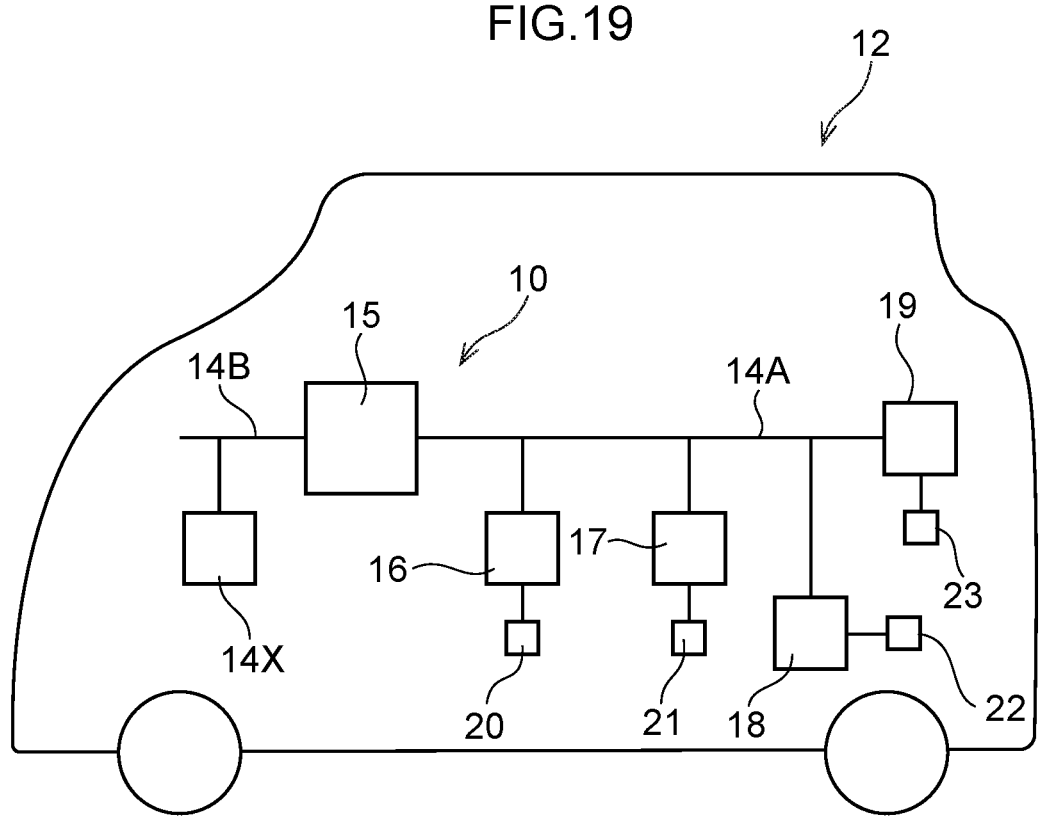
FIG. 19 is a schematic diagram of the vehicle equipped with the in-vehicle network system according to a second example modification.

In the in-vehicle network system 10 of an example modification shown in FIG. 19, clusters are not formed on the first bus 14A. Furthermore, none of the NM-corresponding ECUs are equipped with the message generation unit 161 and the message transmission unit 162. Instead, the gateway 15 is equipped with the message generation unit 161 and the message transmission unit 162. Moreover, the ROM 16B of each of the NM-corresponding ECUs stores information relating to its own standby time. The standby times of the first ECU 16, the second ECU 17, the third ECU 18, and the fourth ECU 19 are mutually different.

The NM message 27 that the gateway 15 generates and sends to the first bus 14A is the same as the NM message 27 shown in FIG. 4. Consequently, when the message reception unit 163 of any NM-corresponding ECU that is in the normal mode receives the NM message 27 that the gateway 15 repeatedly sends to the first bus 14A, the determination unit 164 determines whether or not the standby time recorded in the ROM 16B has elapsed since the reception time of the most recent NM message 27. Then, when the determination unit 164 determines that the standby time has elapsed, the mode switching unit 165 switches this NM-corresponding ECU to the sleep mode.

In this way, in the example modification of FIG. 19, the standby time of each of the NM-corresponding ECUs are different. For that reason, by assigning appropriate standby times to each of the NM-corresponding ECUs, the power consumed by the plural NM-corresponding ECUs connected to the first bus 14A can be reduced.

Three or more ECUs may also be included in one cluster.

Each of the standby times described above may also be set to other lengths. For example, the standby time in a case where a relevant part is in an anomalous state may also be set to 100 seconds.

The special condition may also be met when a condition other than the one described above has been met.

What is claimed is:

1. An in-vehicle network system comprising:
 a plurality of first processors connected to a bus that is mounted at a vehicle and is applied to a partial network, the first processors being switchable between a normal mode and a sleep mode in which the first processors consume less power than the first processors do in the normal mode; and a second processor, wherein each of the first processors or the second processor is configured to send a network management (NM) message to each of the first processors and switch at least one of the first processors that are in the sleep mode and have received the NM message to the normal mode, each of the first processors is configured to:
assign at least one standby time to each of the first processors and differentiate a standby time assigned to at least one of the first processors from a standby time assigned to other of the first processors,
start measuring one of the standby times when sending or receiving one of the NM messages and determine whether or not the standby time has elapsed, and
switch at least one of the first processors in which all of the standby times have been determined to have elapsed, to the sleep mode, a plurality of clusters each including a plurality of the first processors are provided on the bus, each of the first processors is included only in one of the clusters, and each of the first processors is further configured to:
set the standby time per cluster based on at least one of a status of communication in the bus, statuses of the first processors, or statuses of connected devices connected to the first processors,
send the NM message to another first processor in a same cluster that includes the first processor sending the NM message,
receive the NM message from another first processor,
determine whether or not the standby time of the cluster that includes itself has elapsed since a most recent transmission/reception time that is a later time of a transmission time when the NM message is sent by itself or a reception time when the NM message is received by itself, and
be switched to the sleep mode when having determined that the standby time has elapsed.

2. The in-vehicle network system of claim 1, wherein:
the first processors add information relating to the standby time to the NM message, and
the first processors are configured to recognize the standby time that has been added to the NM message when the first processors have sent or received the NM message.

3. The in-vehicle network system of claim 1, wherein the first processors are configured, when it has been determined that there is an anomaly in at least one of the first processors or the connected devices both of which are relevant to at least one of driving, braking, or steering of the vehicle, to make the standby time the first processors set for a predetermined cluster longer than the standby time the first processors set when it has been determined that there is no anomaly.

4. The in-vehicle network system of claim 1, wherein:
the vehicle is equipped with data acquisition devices capable of acquiring data of same types as data acquirable by vehicle-to-vehicle communication with another vehicle, and
the first processors are configured to make the standby times the first processors set for clusters that include first processors connected to the data acquisition devices shorter when the vehicle-to-vehicle communication is being performed than when the vehicle-to-vehicle communication is not being performed.

5. An in-vehicle network system comprising:
a plurality of first processors connected to a bus that is mounted at a vehicle and is applied to a partial network, the first processors being switchable between a normal mode and a sleep mode in which the first processors consume less power than the first processors do in the normal mode; and a second processor, wherein:

each of the first processors or the second processor is configured to send a network management (NM) message to each of the first processors and switch at least one of the first processors that are in the sleep mode and have received the NM message to the normal mode, each of the first processors is configured to:
assign at least one standby time to each of the first processors and differentiate a standby time assigned to at least one of the first processors from a standby time assigned to other of the first processors,
start measuring one of the standby times when sending or receiving one of the NM messages and determine whether or not the standby time has elapsed, and
switch at least one of the first processors in which all of the standby times have been determined to have elapsed, to the sleep mode, a plurality of clusters each including a plurality of the first processors are provided on the bus, at least one of the first processors is included in a plurality of the clusters, and each of the first processors is further configured to:
set the standby time per cluster based on at least one of a status of communication in the bus, statuses of the first processors, or statuses of connected devices connected to the first processors,
send the NM message to another first processor in a same cluster that includes the first processor sending the NM message,
receive the NM message from another first processor,
determine whether or not the standby time has elapsed, in all clusters that include itself, since a most recent transmission/reception time that is a later time of a transmission time when the NM message is sent by itself or a reception time when the NM message is received by itself, and
be switched to the sleep mode when having determined that the standby times of all clusters that include itself have elapsed.

* * * * *